(12) United States Patent
Smith

(10) Patent No.: US 6,763,761 B1
(45) Date of Patent: Jul. 20, 2004

(54) WIPER FOR TWINE KNIFE STRIKER PLATE

(75) Inventor: Kevin Smith, Narvon, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/375,001

(22) Filed: Feb. 28, 2003

(51) Int. Cl.[7] .......................... B65B 63/04; A01D 39/00
(52) U.S. Cl. ................. 100/5; 100/6; 100/13; 100/88; 56/341
(58) Field of Search ........................... 100/5, 6, 8, 13, 100/88, 94, 97, 102; 56/341

(56) References Cited

U.S. PATENT DOCUMENTS

| | | |
|---|---|---|
| 3,554,068 A | 1/1971 | Schwartz |
| 4,253,387 A | 3/1981 | Schmitt et al. |
| 4,306,494 A | 12/1981 | Nishibe et al. |
| 4,563,794 A | 1/1986 | Beeland |
| 4,648,239 A | 3/1987 | Geiser et al. |
| 5,080,009 A | 1/1992 | Fritz et al. |
| 5,191,833 A | 3/1993 | Clevenger, Jr. |
| 5,215,006 A | 6/1993 | Jennings et al. |
| 5,224,329 A | 7/1993 | Viaud |
| 5,437,226 A * | 8/1995 | Wagstaff ..................... 100/5 |
| 5,465,658 A * | 11/1995 | Wagstaff et al. .............. 100/5 |
| 5,595,055 A | 1/1997 | Horchler, Jr. et al. |
| 5,709,143 A | 1/1998 | Bentley |
| 5,816,038 A | 10/1998 | Anderson et al. |
| 5,913,805 A | 6/1999 | Vodon |
| 6,164,050 A | 12/2000 | Vande Ryse et al. |
| 6,209,450 B1 | 4/2001 | Naaktgeboren et al. |
| 6,301,869 B1 | 10/2001 | Schmitcke |
| 6,681,688 B1 * | 1/2004 | Smith ........................... 100/5 |

* cited by examiner

*Primary Examiner*—Allen Ostrager
*Assistant Examiner*—Jimmy Nguyen
(74) *Attorney, Agent, or Firm*—John William Stader; Collin A. Webb (57) ABSTRACT

A round baler, including a housing and bale wrapping apparatus, the bale wrapping apparatus comprising: a rotating twine supply roll defining a twine strand; a twine dispensing arm presenting the twine strand; a shear bar having a cutting surface; a knife assembly rotatingly connected to the housing by an elongated bar and rotatable from a first position to a second cutting position in contact with the cutting surface, wherein the twine dispensing arm is movable from a first position to a second cutting position wherein the twine strand extends transversely between the shear bar and the knife assembly; and a wiper is mounted to the twine dispensing arm so that when the twine dispensing arm moves from the first position to the cutting position, the wiper engages the cutting surface of the shear bar to clean trash from the cutting surface of the shear bar.

9 Claims, 7 Drawing Sheets

WIPER FOR TWINE KNIFE STRIKER PLATE

FIELD OF THE INVENTION

The present invention pertains to round balers with a twine wrapping apparatus that includes twine wrapping arms and a twine cutting apparatus. More particularly, the present invention pertains to an improved twine wrapping apparatus that has a wiper mounted to the twine wrapping arms wherein the wiper periodically wipes or clears accumulating trash from the shear bar of the cutting apparatus.

BACKGROUND OF THE INVENTION

Typical round balers (also referred to simply as a "balers"), such as disclosed in U.S. Pat. No. 6,209,450 to Naaktgeboren et al., are agricultural machines that pick up a cut crop material from the ground and form it into a compacted round bale in a bale-forming chamber. When the bale has been sufficiently compacted to a desired density or a desired size depending on the baler construction, appropriate sensors, such as a bale density or bale size sensor, send signals to a controller. The controller subsequently sends a signal to an operator's panel to stop forward motion of the baler so that a bale wrapping operation can be performed. In this way, the formed bale is wrapped with netting or twine to produce a completed, wrapped bale.

As is conventionally known, the wrapping operation is performed by a bale wrapping mechanism controlled by a bale wrapping algorithm preprogrammed into a controller (i.e., microprocessor) that is part of the baler. The bale wrapping mechanism has two twine wrapping tubes/arms, wherein each tube/arm dispenses a single strand of twine. When a wrap cycle is initiated, the end of each twine strand dangles from its twine tube and is caught by the bale as the bale continues to rotate in the bale forming chamber. As the bale rotates, the caught ends of the twine strands rotate with the bale and twine is wrapped around the bale. At the end of a wrap cycle, a tying operation is performed as is generally known. Before the completed, wrapped bale can be expelled from the baler, the twine strands must be cut.

The bale wrapping mechanism includes a knife assembly having a cutting edge, and a shear bar that cooperates with the cutting edge of the knife assembly. The knife assembly generally includes two knives (i.e., a right knife and a left knife), each with its own cutting edge. At the start of a wrap cycle, the twine strands are positioned between the knife assembly and the shear bar, and the knife assembly and shear bar are spaced apart so that the twine strands can move freely between the knife assembly and the shear bar. At the end of the wrap cycle (i.e., after the twine ends have been secured by tying), the knife assembly moves by translation or rotation to engage the shear bar, so that the cutting edge of each knife of the knife assembly pinches a respective one of the twine strands against the shear bar, and the twine strands are cut.

One drawback of the prior art bale wrapping mechanism is that during the bale forming operation trash (i.e. errant cut crop material and other debris) tends to accumulate on inner surfaces of the bale wrapping mechanism. This includes accumulation of trash on the shear bar of the knife assembly. When enough trash accumulates on the surface of the shear bar, the trash begins to interfere with the cutting efficiency of the knife assembly. Specifically, the trash prevents the knife edge of the knife assembly's pivoting knife to properly engage the shear bar and cut the twine at the end of the bale wrapping cycle. When this happens, the twine wrapping mechanism is not able to properly expel the wrapped bale and start another bale wrapping cycle. Thus, there is a need for a shear bar cleaning mechanism that periodically removes accumulating trash material from the surface of the shear bar in round balers having two twine arms, wherein each twine arm dispenses a single twine strand. Preferably, the cleaning mechanism's periodic removal of trash from the shear bar is timed to occur soon before the twine cutting operation to optimize cutting efficiency. In addition, there is a need for a shear bar cleaning mechanism that can be utilized by the new round balers that include a bale wrapping apparatus having four twine wrapping tubes and two twine arms, wherein each tube dispenses a single strand of twine and each twine arm carries two twine wrapping tubes. The advantage of a round baler having four twine strands provided for wrapping over the conventional two twine strands is that four strands permit completion of the wrapping operation in less time than can be achieved when only two strands are available; however, the drawback of these newer four twine strand dispensing bale wrapping mechanisms is that they are more sensitive to the effects of trash accumulating on the shear bars so they have a greater need for a shear bar cleaning mechanism.

For these reasons, it would be advantageous to have a bale wrapping mechanism that includes two twine arms, a knife assembly, and a shear bar cleaning mechanism, wherein the shear bar cleaning mechanism periodically clears the shear bar of accumulating trash to ensure reliable severing of all of the twine strands.

The present invention endeavors to provide a round baler with an improved bale wrapping apparatus with a knife assembly and a shear bar cleaning mechanism to periodically clear the shear bar of accumulating trash to ensure reliable cutting of all of the twine strands.

Accordingly, an object of the present invention is to overcome the disadvantages of prior art round balers.

Another object of the present invention is to provide a round baler with an improved bale wrapping apparatus having a knife assembly, wherein the bale wrapping apparatus has two twine wrapping arms, and each twine wrapping arm has a wiper mounted thereon so that each wiper clears accumulating trash from a surface of a respective shear bar when the twine arm moves from a first position to a cutting position.

A still further object of the present invention is to provide a round baler with an improved bale wrapping apparatus, having wipers mounted to each twine wrapping arm and a knife assembly, that is durable and that reliably cuts all of the twine strands.

Yet another object of the present invention is to provide a round baler with an improved bale wrapping apparatus, having wipers mounted to each twine wrapping arm and a knife assembly, that is easy to maintain.

SUMMARY OF THE INVENTION

In accordance with the above objectives, one embodiment of the present invention provides a round baler, including a housing with a bale chamber defined therein, and a bale wrapping apparatus disposed in the housing adjacent the bale chamber to wrap a rotating bale formed in the chamber, the bale wrapping apparatus comprising: (a) a rotating first twine supply roll defining a first twine strand; (b) a first twine dispensing arm presenting the first twine strand; (c) a first shear bar connected to the housing, wherein the first shear bar has a cutting surface; (d) a first knife assembly rotatingly connected to the housing by an elongated bar and rotatable from a first position to a second cutting position in contact with the cutting surface of the first shear bar, wherein the first twine dispensing arm is movable from a first position presenting the first twine strand to the bale to a second cutting position wherein first twine strand extends transversely between the first shear bar and the first knife assembly; and (e) a first wiper mounted to the first twine dispensing arm so that when the first twine dispensing arm moves from the first position to the cutting position, the first wiper engages the cutting surface of the first shear bar to wipe the cutting surface of the first shear bar.

In accordance with a second embodiment, the first embodiment is modified so that the first wiper is mounted to an outside edge of the first twine dispensing arm.

In accordance with a third embodiment, the first embodiment is modified to further include: (f) a rotating second twine supply roll defining a second twine strand; (g) a second twine dispensing arm presenting the second twine strand; (h) a second shear bar connected to the housing, wherein the second shear bar has a cutting surface; (i) a second knife assembly rotatingly connected to the housing by the elongated bar and rotatable from a first position to a second cutting position in contact with the cutting surface of the second shear bar, wherein the second twine dispensing arm is movable from a first position presenting the second twine strand to the bale to a second cutting position wherein the second twine strand extends transversely between the second shear bar and the second knife assembly; and (j) a second wiper mounted to the second twine dispensing arm so that when the second twine dispensing arm moves from the first position to the cutting position, the second wiper engages the cutting surface of the second shear bar to wipe the cutting surface of the second shear bar.

In accordance with a fourth embodiment, the third embodiment is further modified so that the first wiper is mounted to an outside edge of the first twine dispensing arm and the second wiper is mounted to an outside edge of the second twine dispensing arm.

In accordance with a fifth embodiment, the fourth embodiment is modified so that the bale wrapping apparatus further includes: (k) a rotating third twine supply roll defining a third twine strand and a rotating fourth twine supply roll defining a fourth twine strand, wherein the first twine dispensing arm presents the third twine strand and the second twine dispensing arm presents the fourth twine strand so that the first twine dispensing arm presents the third twine strand to the bale when in the first position and the third twine strand extends transversely between the first shear bar and the first knife assembly when the first twine dispensing arm is in the cutting position, and wherein the second twine dispensing arm presents the fourth twine strand to the bale when in the first position and the fourth twine strand extends transversely between the second shear bar and the second knife assembly when the second twine dispensing arm is in the cutting position.

In accordance with a sixth embodiment, the first embodiment is further modified so that the first wiper is a brush.

In accordance with a seventh embodiment, the first embodiment is further modified so that the first wiper comprises a piece of resilient material.

In accordance with an eighth embodiment, the third embodiment is further modified so that the both the first wiper and the second wiper are brushes.

In accordance with a ninth embodiment, the third embodiment is further modified so that each of the first wiper and the second wiper comprise a piece of resilient material.

Further objects, features and advantages of the present invention will become apparent from the Detailed Description of Preferred Embodiments, which follows, when considered together with the attached drawings.

DETAILED DESCRIPTION OF THE PREFERRED EMBODIMENTS

Figure 1:
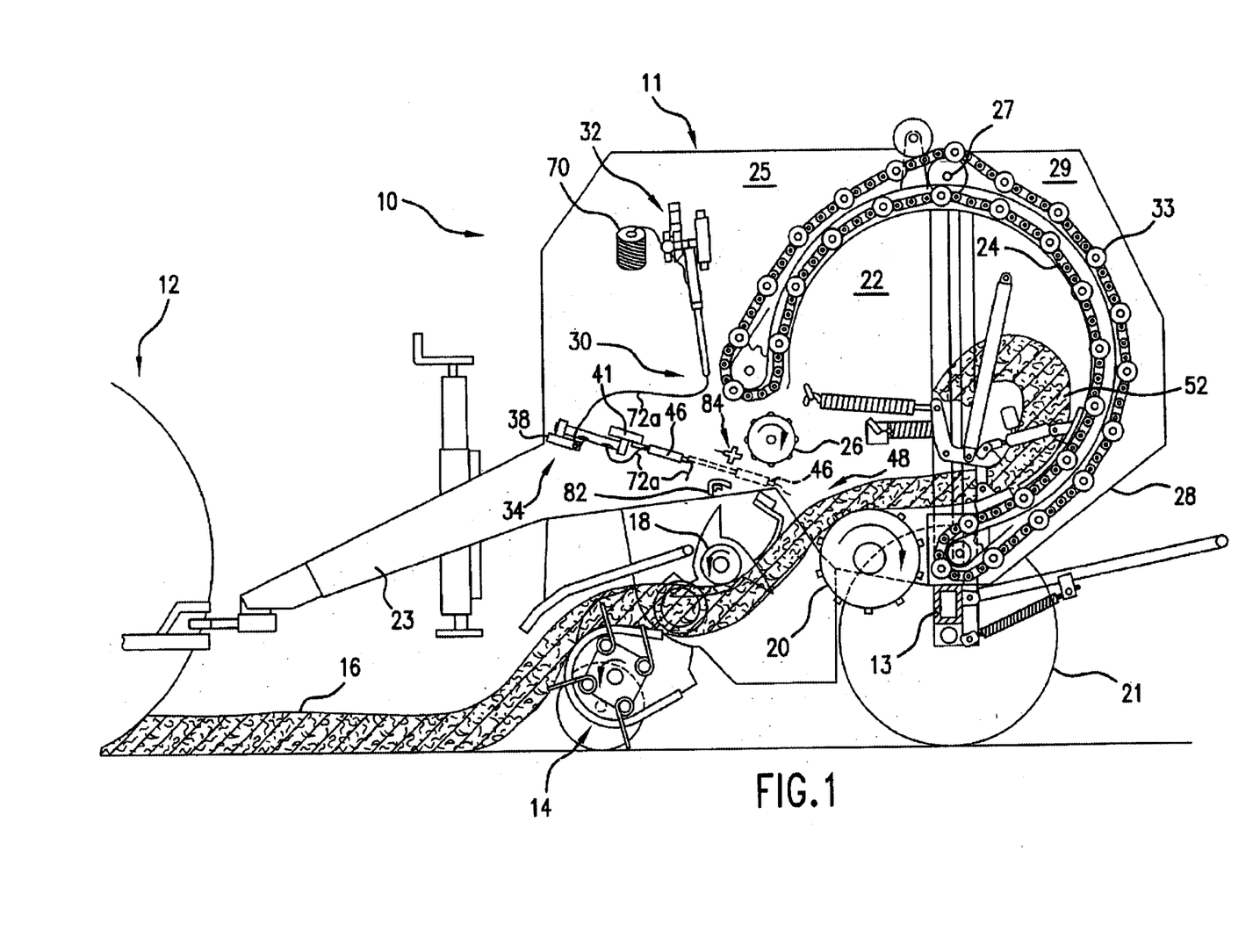
FIG. 1 is a cutaway side elevational view of a round baler in accordance with the present invention.

The preferred embodiments of the invention will now be described with reference to the Figures in which like parts are indicated by like reference numerals. The apparatus of the present invention as shown in FIG. 1 is a round baler 10 including a main frame or housing 11 and a bale forming chamber 22 formed inside of housing/frame 11, wherein the bale forming chamber is illustrated as a fixed bale forming chamber for forming a geometrical package out of cut crop material 16. The geometrical package of cut crop material formed in the bale forming chamber 22 is known as a "bale." The bale is formed by a chain conveyer 24, also referred to as an "apron," that surrounds and defines a portion of the chamber 22. Apron 24 serves to rotate the cut crop material in the bale forming chamber 22 by using slats 33 of the apron 24 that engage and rotate the cut crop material, thereby moving the cut crop material about the bale forming chamber 22 to form the bale 52 as described in U.S. Pat. No. 6,164,050, which is incorporated herein by reference in its entirety. Preferably, the bale produced in the bale forming chamber 22 has a cylindrical shape. However, one skilled in the art would appreciate that the present invention can be practiced on balers that produce rectangular bales and can be practiced by round balers having a variable bale forming chamber.

Main frame 11 includes a main support beam 13 on which a pair of wheels 21 (only one shown) is rotatably affixed. A tongue 23 extends from a front portion of frame 11 to provide a conventional hitch connection for connecting to a tractor 12 or other work vehicle. Frame 11 also includes a pair of sidewalls 25 (only one shown) between which the bale forming chamber 22 extends. A pair of stub shafts 27 (only one shown) pivotally connect tailgate 28 to main frame 11. Tailgate 28 pivotally rotates about the stub shafts 27 from the closed position shown in FIG. 1 to an open position, as is conventionally known, so that a completed wrapped bale can be discharged to the ground for subsequent handling. Tailgate 28 includes a pair of tailgate sidewalls 29 (only one shown) that are coextensive with sidewalls 25.

Baler 10 includes a pick-up assembly 14 for picking up a cut crop material 16, such as straw, hay, and the like, from a field, and delivering it to a moving conveyer 18. Conveyer 18 feeds the cut crop material into the bale forming chamber 22 while the baler moves across a field. Although FIG. 1 shows conveyer 18 to be a feeder rotor, one skilled in the art would recognize that a stuffer mechanism, such as disclosed in U.S. Pat. No. 5,595,055 to Horchler, Jr., et al., which is incorporated herein by reference in its entirety, could be used in place of the feeder rotor without departing from the scope of the present invention. The pick-up assembly 14 operates in a conventionally-known manner.

The bale forming chamber 22 is defined by the coextensive sidewalls 25 and 29, apron 24, rotating floor roll 20, and rotating stripper roll 26. A rotating bale 52 is formed within the bale forming chamber 22 when cut crop material is fed into the chamber by the pickup assembly 14, as is conventionally known. When the bale 52 reaches a predetermined size, such as occurs in variable size chambers, or, in the alternative, when the bale 52 reaches a predetermined density, such as occurs in fixed size chambers, appropriate size or density sensors, respectively, indicate that the bale is ready to be wrapped. Subsequently, the baler 10 stops its forward motion while a bale wrapping operation is performed by a bale wrapping assembly 30.

Bale wrapping assembly 30 is disposed within housing/frame 11 so as to be adjacent to the bale forming chamber 22 and serves to wrap wrapping material, such as net, twine or plastic sheet, around the bale 52 formed within the bale forming chamber. The bale wrapping assembly 30 illustrated in FIG. 1 includes a twine wrapping apparatus 32 and may include a net wrapping apparatus (not shown) as is, for example, disclosed in U.S. Pat. No. 6,209,450. Typically, the twine wrapping apparatus 32 dispenses twine 72a that is stored on a rotatable twine ball 70, and the net wrapping apparatus dispenses netting or plastic sheet that is stored on a roll. When the bale 52 is completely formed, the operator of the baler 10 operates the bale wrapping assembly to dispense either twine 72a or netting/plastic sheeting in a known manner.

Figure 2:
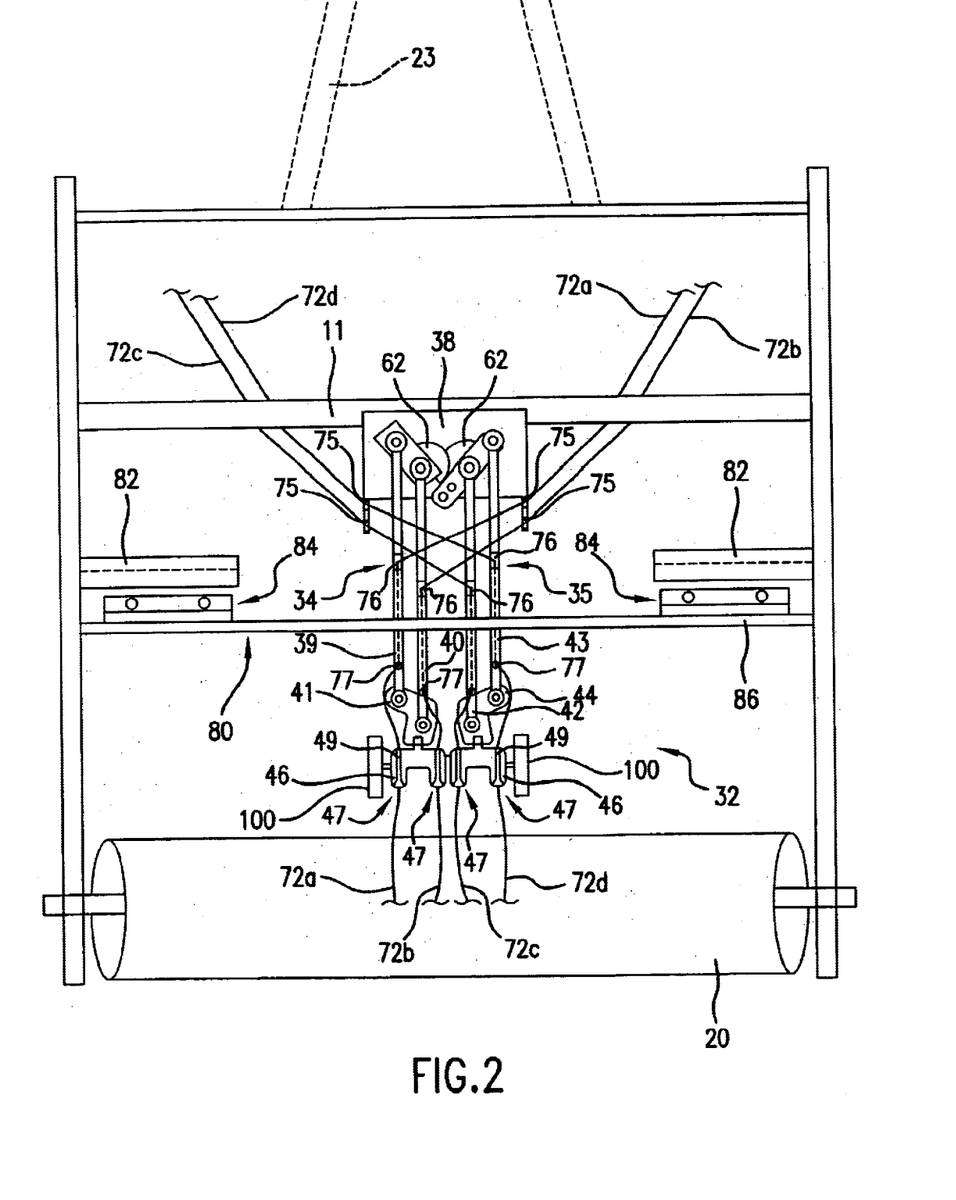
FIG. 2 schematically illustrates a plan view of the twine wrapping apparatus and the twine cutting mechanism with the twine arms in the first position.
Figure 3:
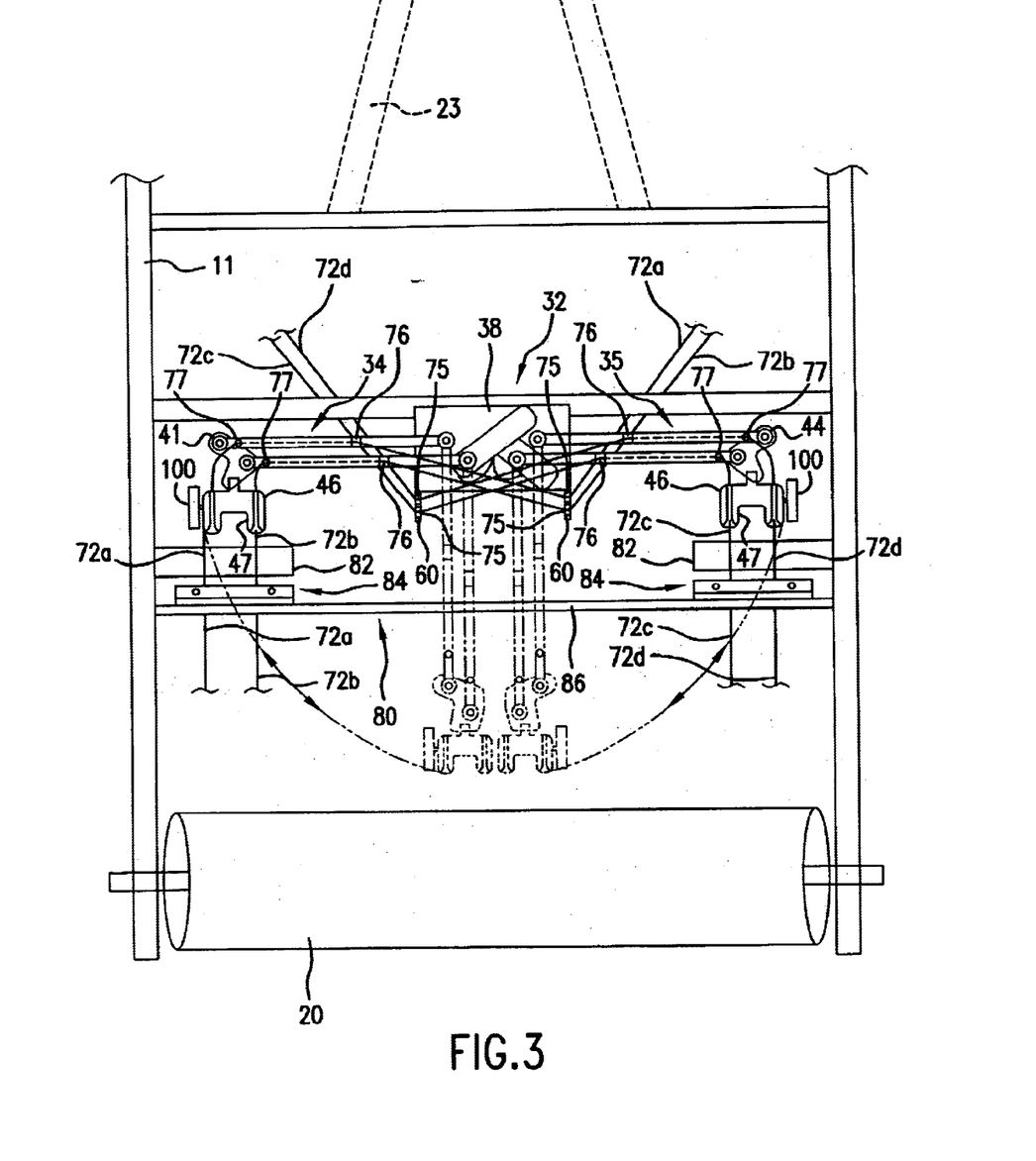
FIG. 3 schematically illustrates a plan view of the twine wrapping apparatus and the twine cutting mechanism with the twine arms in the cutting position.

Twine wrapping apparatus 32 includes two pivotally mounted twine arms 34 and 35 (only 34 is shown in FIG. 1) upon which are mounted one or two twine dispensing members 47, which may also be referred to as a "twine tube." Although the present invention can be practiced so that each twine arm 34, 35 has only one twine dispensing member 47 mounted thereon; preferably, each twine arm has two twine dispensing members mounted thereto as shown in FIGS. 2 and 3. For the purposes of illustration, only a baler in which each twine arm 34 and 35 carries two twine dispensing members 47 will be described in detail. However, U.S. Pat. No. 5,215,006 to Jennings et al., the disclosure of which is incorporated herein by reference in its entirety, describes a baler wherein each twine arm carries only one twine dispensing member, and the present invention could be applied to this or similar balers.

Figure 4:
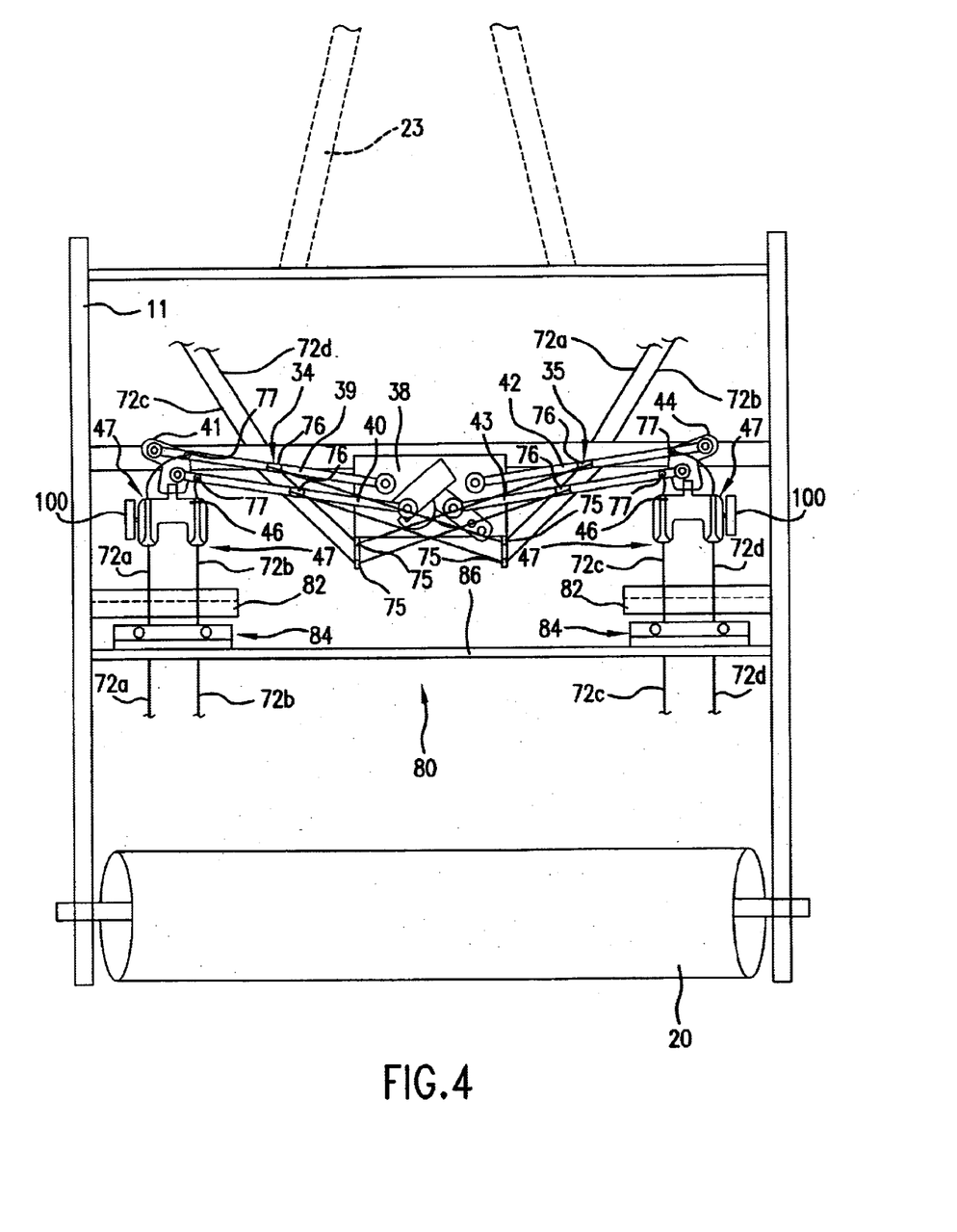
FIG. 4 schematically illustrates a plan view of the twine wrapping apparatus and the twine cutting mechanism with the twine arms in the home position.

As shown in FIGS. 2, 3 and 4, the twine wrapping apparatus 32 has a base mount 38 connected to frame 11. Twine arms 34 and 35 are pivotally mounted on base mount 38 so that each twine arm can pivot between a "first position" shown in FIG. 2 at the start of a twine wrapping cycle as will be described later to a "cutting position" as shown in FIG. 3. Each twine arm 34, 35 is pivoted by a twine arm activating member 62 that is connected to the twine arms and to a twine arm actuating motor (not shown). Between twine wrapping cycles, the twine arms 34, 35 are stored in a "home position" as shown in FIG. 4. Twine arm 34 includes two link members 39, 40 that are pivotally connected at one end to the base mount 38 and pivotally connected at another end to cam member 41. Twine arm 35 includes two link members 42, 43 that are pivotally connected at one end to base mount 38 and pivotally connected at another end to cam member 44. Each cam member 41 and 44 is connected to an arm member 46 that has two twine dispensing members 47.

Baler 10 is provided with one or more, in this embodiment four rotatable twine balls 70 (only one shown), and each twine ball provides one of the twine strands 72a, 72b, 72c, and 72d. Each twine strand 72a, 72b, 72c, and 72d is threaded through a respective hole 75 in the base mount 38 and through a respective one of the link members 39, 40, 42, 43 because each link member 39, 40, 42, 43 is a hollow tube with openings 76, 77 through which a twine strand may pass. Arm members 46 include two tubular hollow portions 49 through which a twine strand may pass. Each twine dispensing member 47 is preferably a hollow tube that is contiguous with one of the tubular hollow portions 49 of the arm members 46 so that a twine strand may pass through a respective contiguous hollow tube portion 49 and corresponding twine dispensing member 47.

During baler operation, the formation of a bale 52 is achieved in the conventional manner while baler 10 moves along a field of cut crop material picking up the cut crop material with pick-up assembly 14, and delivers the cut crop material using conveyer 18 to move the cut crop material through bale chamber inlet 48 defined by floor roll 20 and stripper roll 26. When the bale 52 has reached a certain size or density, depending upon whether baler 10 is a variable chamber baler or a fixed chamber baler, size or density sensors (as appropriate) are activated and signal the operator or an on board computer that bale 52 is ready for the bale wrapping operation. Upon initiation of the bale wrapping operation, the twine arms 34, 35 move from the home position shown in FIG. 4 to the first position shown in FIGS. 2 and 5. In the first position, the ends of twine strands 72a, 72b, 72c, and 72d dangle into inlet 48 where they get caught and carried by the rotating bale 52. In this manner, the twine strands 72a, 72b, 72c, and 72d wrap around bale 52 and secure the cut crop material as the bale rotates. During a predetermined sufficient number of wrappings, twine arms 34, 35 pivot from the first position back to the cutting position shown in FIG. 3 so that twine is wrapped around both the center and the peripheral portions of bale 52. When the twine arms 34, 35 reach the cutting position, there is tension in each of the twine strands 72a, 72b, 72c, and 72d and a cutting procedure takes place to cut each of the twine strands 72a, 72b, 72c, and 72d simultaneously. The bale wrapping operation concludes with the cutting of the twine strands, the twine arms 34, 35 return to the home position, and the completed wrapped bale is discharged to the ground when tailgate 28 opens.

The present invention is particularly directed to a wiper mounted on each twine arm 34, 35 so as to provide a shear bar cleaning mechanism for cleaning accumulating trash off of the cutting surface of the shear bars of a twine cutting mechanism. Specifically, the twine cutting mechanism is part of the twine wrapping assembly 32 and performs the cutting procedure that simultaneously severs each one of the twine strands 72a, 72b, 72c, and 72d at the end of a bale wrapping cycle. Twine cutting mechanism 80 includes two shear bars 82 (also referred to as "striker plates") connected to housing/frame 11, and two knife assemblies 84 rotatingly connected to the housing/frame 11 by an elongated bar 86 so as to rotate from a first knife position shown in FIG. 5 to a second knife cutting position shown in FIG. 6. Each knife assembly 84 is disposed so as to contact a cutting surface 88 on a respective one of the shear bars 82 when the knife assemblies have been rotated into the second knife cutting position.

Figure 5:
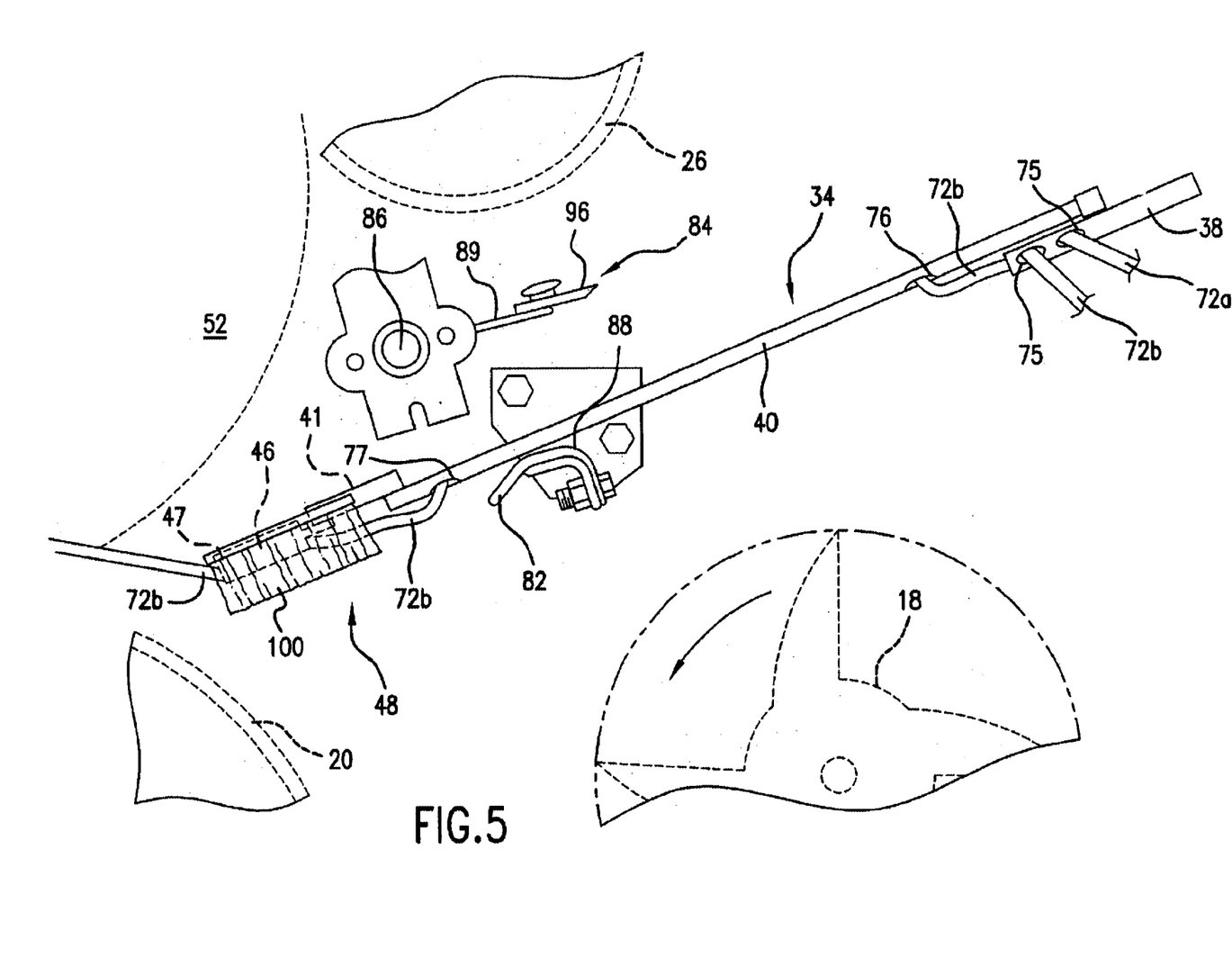
FIG. 5 schematically illustrates a side view of the twine cutting mechanism with the knife assembly in the first knife position and the twine arms of the twine wrapping apparatus in the first position.
Figure 6:
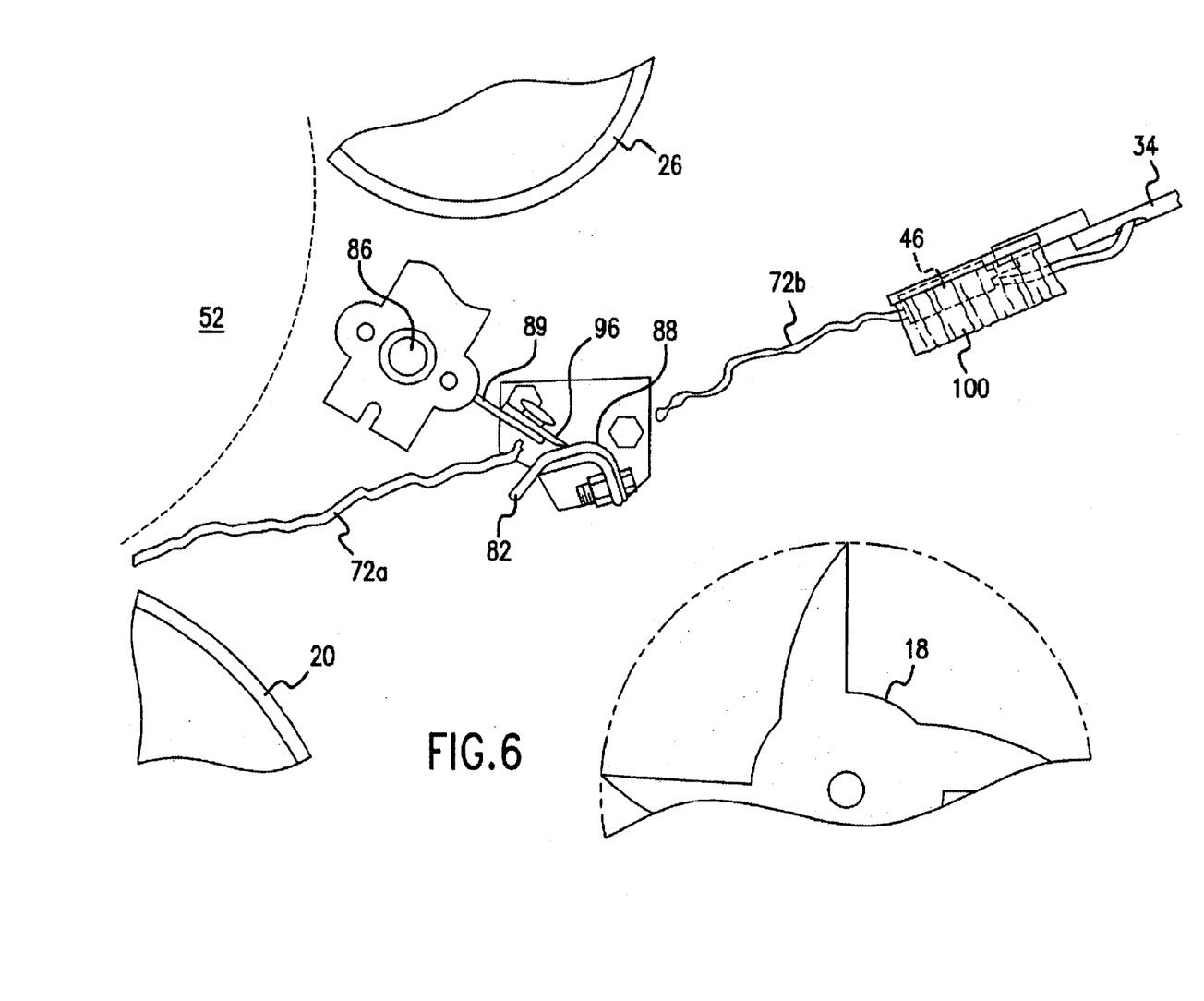
FIG. 6 schematically illustrates a side view of the twine cutting mechanism with the knife assembly in the second knife cutting position and the twine arms of the twine wrapping apparatus in the cutting position.

Each knife assembly 84 includes a knife 96 mounted on a mounting member 89 that is attached to the elongated bar 86. Thus, when elongated bar 86 is rotated by an actuation mechanism (not shown), each knife 96 moves from the first knife position to the cutting position to cut those twine strands extending transversely between the knife assembly 84 and the respective shear bar 82. FIGS. 5 and 6, for example, show how one twine strand 72b is cut by knife 96 as it moves from the first knife position to the cutting position where it engages the cutting surface 88 of shear bar 82.

Figure 7:
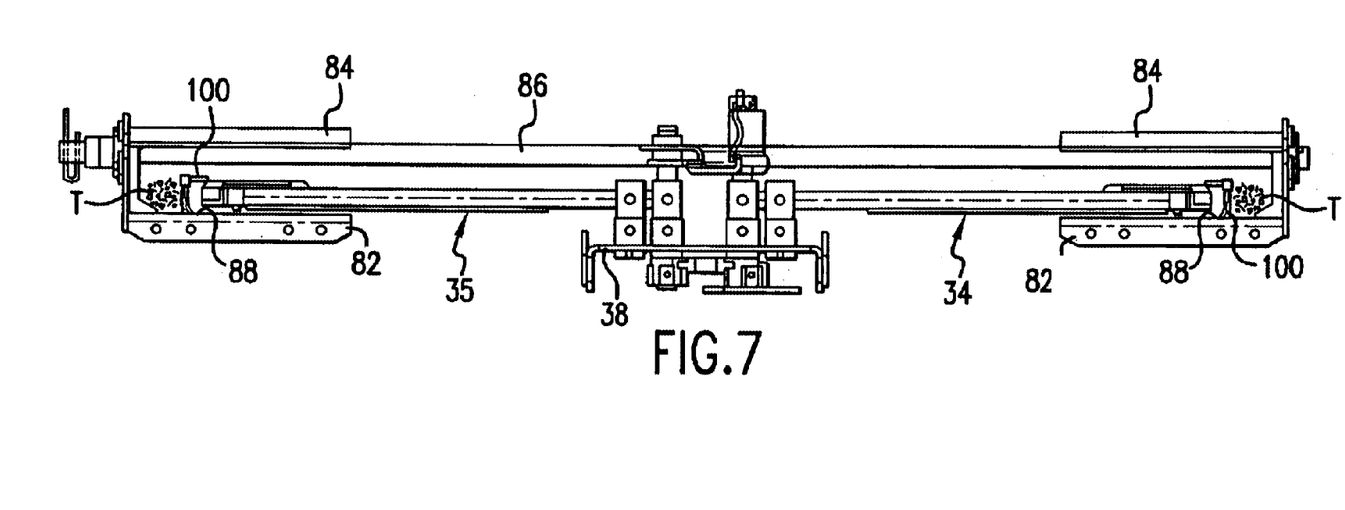
FIG. 7 is a schematic front view of a portion of the twine wrapping assembly showing the relationship between the twine arms and the shear bars in accordance with the present invention.

In accordance with the present invention, each twine arms 34, 35 has a wiper 100 mounted thereon, preferably to a lateral or outside edge such as provided by the lateral or outside edge of the arm members 46 of each twine arm 34, 35 as shown in FIGS. 2–4 and 7. FIG. 7 shows how each wiper 100 is disposed on its respective twine arm 34, 35 so as to extend below the twine arm so as to engage the cutting surface 88 of the respective shear bar 82. In this manner, as each twine arm 34, 35 moves from the first position shown in FIG. 2 to the cutting position shown in FIG. 3, each wiper 100 engages the cutting surface 88 of a respective one of the shear bars 82 thereby removing accumulating trash material T from the respective cutting surface as it sweeps across the shear bar.

Preferably, each wiper 100 is made of a material that is flexible or resilient so that it will conform to the cutting surface 88 of the shear bar 82. A brush, for example, is suitable for providing a wiper 100 in accordance with the present invention because the flexible bristles of the brush are capable of deflecting to conform to the contour of the cutting surface 88. Likewise, a piece of resilient rubber material, elastomeric material, synthetic rubber-like material, or any other suitable resilient material, would be a suitable alternative material to the flexible bristles of a brush for use as a wiper 100 in accordance with the present invention.

To summarize, wipers 100 are provided in accordance with the present invention and mounted onto each twine arm 34, 35 so as to provide a shear bar cleaning mechanism for wiping and cleaning accumulating trash off of the cutting surface of the shear bars of the twine cutting mechanism. When the twine arms 34, 35 move from the first position to the cutting position, the wipers 100 engage the cutting surfaces 88 of the shear bars 82 so as to wipe and clean accumulating trash material T off of the cutting surfaces as the wipers sweep across the cutting surfaces of the shear bars. In this manner, the cutting surface 88 of each shear bar 82 is swept clean of accumulating trash material immediately before the step of cutting the twine strands 72a, 72b, 72c, and 72d that occurs at the end of each bale wrapping cycle while the twine arms 34, 35 are in the cutting position. Consequently, the cutting efficiency of the knife assemblies 84 of the twine cutting mechanism 80 is optimized because the cutting surfaces 88 of the shear bars 82 are swept free of accumulated trash material about the time the knife assemblies cut all of the twine strands.

Of course, this shear bar cleaning mechanism featured above for cleaning accumulating trash off of the shear bars can be applied to bailers with one twine dispensing member per twine arm or with two twine dispensing members per twine arm without deviating from the scope and spirit of the present invention.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

What is claimed is:

1. A round baler, including a housing with a bale chamber defined therein, and a bale wrapping apparatus disposed in the housing adjacent the bale chamber to wrap a rotating bale formed in the chamber, the bale wrapping apparatus comprising:
   (a) a rotating first twine supply roll defining a first twine strand;
   (b) a first twine dispensing arm presenting the first twine strand;
   (c) a first shear bar connected to the housing, wherein the first shear bar has a cutting surface;
   (d) a first knife assembly rotatingly connected to the housing by an elongated bar and rotatable from a first position to a second cutting position in contact with the cutting surface of the first shear bar, wherein the first twine dispensing arm is movable from a first position presenting the first twine strand to the bale to a second cutting position wherein first twine strand extends transversely between the first shear bar and the first knife assembly; and
   (e) a first wiper mounted to the first twine dispensing arm so that when the first twine dispensing arm moves from the first position to the second cutting position, the first wiper engages the cutting surface of the first shear bar to wipe the cutting surface of the first shear bar.

2. A round baler as recited in claim 1, wherein the first wiper is mounted to an outside edge of the first twine dispensing arm.

3. A round baler as recited in claim 1, wherein the bale wrapping apparatus further comprises:
   (f) a rotating second twine supply roll defining a second twine strand;
   (g) a second twine dispensing arm presenting the second twine strand;
   (h) a second shear bar connected to the housing, wherein the second shear bar has a cutting surface;
   (i) a second knife assembly rotatingly connected to the housing by the elongated bar and rotatable from a first position to a second cutting position in contact with the cutting surface of the second shear bar, wherein the second twine dispensing arm is movable from a first position presenting the second twine strand to the bale to a second cutting position wherein second twine strand extends transversely between the second shear bar and the second knife assembly; and
   (j) a second wiper mounted to the second twine dispensing arm so that when the second twine dispensing arm moves from the first position to the cutting position, the second wiper engages the cutting surface of the second shear bar to wipe the cutting surface of the second shear bar.

4. A round baler as recited in claim 3, wherein the first wiper is mounted to an outside edge of the first twine dispensing arm and the second wiper is mounted to an outside edge of the second twine dispensing arm.

5. A round baler as recited in claim 4, wherein the bale wrapping apparatus further comprises:

(k) a rotating third twine supply roll defining a third twine strand and a rotating fourth twine supply roll defining a fourth twine strand, wherein the first twine dispensing arm presents the third twine strand and the second twine dispensing arm presents the fourth twine strand so that the first twine dispensing arm presents the third twine strand to the bale when in the first position and the third twine strand extends transversely between the first shear bar and the first knife assembly when the first twine dispensing arm is in the cutting position, and wherein the second twine dispensing arm presents the fourth twine strand to the bale when in the first position and the fourth twine strand extends transversely between the second shear bar and the second knife assembly when the second twine dispensing arm is in the cutting position.

6. A round baler as recited in claim 1, wherein the first wiper is a brush.

7. A round baler as recited in claim 1, wherein the first wiper comprises a piece of elastomeric material.

8. A round baler as recited in claim 3, wherein both the first wiper and the second wiper are brushes.

9. A round baler as recited in claim 3, wherein each of the first wiper and the second wiper comprise a piece of elastomeric material.

* * * * *